United States Patent
Boyer et al.

(10) Patent No.: US 9,631,662 B2
(45) Date of Patent: Apr. 25, 2017

(54) SPRING CLIP APPARATUS

(71) Applicant: Ramco Specialties, Inc., Hudson, OH (US)

(72) Inventors: Mark S. Boyer, South Lyon, MI (US); Gerald P. Downey, Sterling Heights, MI (US)

(73) Assignee: Ramco Specialties, Inc., Hudson, OH (US)

( * ) Notice: Subject to any disclaimer, the term of this patent is extended or adjusted under 35 U.S.C. 154(b) by 29 days.

(21) Appl. No.: 14/662,433

(22) Filed: Mar. 19, 2015

(65) Prior Publication Data

US 2015/0267734 A1    Sep. 24, 2015

Related U.S. Application Data

(60) Provisional application No. 61/955,403, filed on Mar. 19, 2014.

(51) Int. Cl.
*F16B 37/04* (2006.01)
*F16B 37/02* (2006.01)

(52) U.S. Cl.
CPC ............ *F16B 37/02* (2013.01); *F16B 37/043* (2013.01)

(58) Field of Classification Search
CPC .......... F16B 5/06; F16B 5/0635; F16B 37/00; F16B 37/02; F16B 37/043; F16B 37/04
USPC ......... 411/172, 174–176, 182, 183, 508–509
See application file for complete search history.

(56) References Cited

U.S. PATENT DOCUMENTS

| | | | | |
|---|---|---|---|---|
| 3,486,158 A | * | 12/1969 | Soltysik | F16B 5/0233 411/44 |
| 5,249,900 A | * | 10/1993 | Mitts | F16B 37/043 411/182 |
| 5,632,584 A | * | 5/1997 | Acevedo | F16B 37/043 411/182 |
| 5,873,690 A | * | 2/1999 | Danby | F16B 37/043 411/182 |
| 5,919,019 A | * | 7/1999 | Fischer | F16B 37/043 411/112 |
| 6,095,734 A | * | 8/2000 | Postadan | F16B 37/043 411/173 |
| 6,629,809 B2 | * | 10/2003 | Vassiliou | F16B 37/041 411/173 |
| 6,896,464 B1 | * | 5/2005 | Vassiliou | F16B 37/041 411/173 |
| 6,908,274 B1 | * | 6/2005 | Vassiliou | F16B 37/02 411/173 |

(Continued)

*Primary Examiner* — Roberta Delisle
(74) *Attorney, Agent, or Firm* — Vorys, Sater, Seymour and Pease LLP

(57) ABSTRACT

A spring clip fastener includes a body member, a base member, first and second carrier members on opposite edges of the base member, first and second positioning members carried by the first and second carrier members, and first and second locking members carried by the first and second carrier members. The body member is configured to receive an associated joining fastener along a first body member axis to selectively couple a first panel with the spring clip apparatus. The first and second carrier members are insertable into an opening in a second panel. The first and second locking members are directed towards the base member and include distal ends extending outwardly of the base member to selectively fasten the second panel between the distal ends and the base member.

20 Claims, 7 Drawing Sheets

(56) References Cited

U.S. PATENT DOCUMENTS

| | | | |
|---|---|---|---|
| 7,086,125 B2 * | 8/2006 | Slobodecki | B60R 13/0206 24/293 |
| 7,226,260 B2 * | 6/2007 | Jackson, Jr. | F16B 21/076 411/112 |
| 8,240,964 B2 * | 8/2012 | Motsch | F16B 37/043 411/112 |
| 2004/0265094 A1 | 12/2004 | Gordon | |
| 2007/0234678 A1 | 10/2007 | Massengill | |

* cited by examiner

SPRING CLIP APPARATUS

CROSS-REFERENCE TO RELATED APPLICATION

This application claims the benefit of U.S. Provisional Application No. 61/955,403 filed on Mar. 19, 2014, the contents of which are incorporated by reference herein in its entirety.

TECHNICAL FIELD

The present disclosure relates generally to fasteners and, in particular, to fasteners for selectively coupling associated members such as associated panel members in a mutual face to face relationship.

BACKGROUND

In many applications it is necessary to fasten together two or more members, such as panels or plates. In one mode, it is desired that the panels remain fixed together, yet in another mode the panels are selectively releasable from their stacked fixed relationship. For example, vehicle body members typically include at least two panels that must be fastened together for protection of components, aesthetics, aerodynamic efficiency, and for other reasons. However, is often desirable that these panels also be selectively removable from each other such as to provide access to certain otherwise protected or hidden portions of the vehicle. For example, a central undercarriage panel member of an automobile covering the underside of the engine may need to be securely fastened relative one or more surrounding support panel members during use of the automobile, while also being selectively removable relative to the one or more surrounding panels for various reasons including to provide access for servicing of the associated vehicle or the like.

Many different types of releasable fasteners have been developed to address this problem and for this type of application. It is equally important that the panel members can be selectively separated when desired, yet remain securely connected by the fastener in their relative stacked orientation during use of the panels such as for example during use in extreme road conditions for automotive application of the fasteners. In addition, it is desired that the one or more fasteners used to selectively mutually connect the panels may be carried by one or the other of the panels during manufacture to help expedite the connection and enhance manufacturing efficiency.

BRIEF SUMMARY OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments, nor delineate the scope of the appended claims. Its sole purpose is to present some concepts of the example embodiments in a simplified form as a prelude to the more detailed description that is presented later.

In accordance with embodiments herein, a spring clip fastener apparatus is provided for releasably connecting one or more associated members. In one embodiment the spring clip apparatus is configured for use in releasably connecting associated first and second panel members each having, respectively, opposite front and rear surfaces to selectively couple the panel members with the front surface of the first panel facing the front surface of the second panel.

Overall, in one embodiment, the spring clip fastener includes a body member, a substantially planar base member operatively coupled with the body member, first and second carrier members on opposite first and second edges of the substantially planar base member, first and second positioning members carried on proximal ends thereof by the first and second carrier members respectively, and first and second locking members carried on proximal ends thereof by the first and second carrier members respectively. The body member is configured to receive an associated joining fastener such as a threaded bolt for example along a first body member axis to selectively couple the associated first panel with the spring clip apparatus. Each of the first and second carrier members extend in a first direction substantially perpendicular to a plane defined by the substantially planar base member. In one embodiment, each of the first and second carrier members extend towards each other inwardly in a direction about 27° relative to a plane perpendicular to the plane defined by the substantially planar base member. The first and second positioning members are directed relative to the first carrier member in a second direction substantially opposite the first direction and each comprise a distal end extending outwardly of the first and second edges respectively of the base member relative to the first body member axis, wherein the distal ends of the first and second positioning members define free end portions curved inwardly relative to the first body member axis. The first and second locking members are directed relative to the first carrier member in the second direction substantially parallel with the first and second positioning members and each comprise a distal end extending outwardly of the first and second edges of the base member relative to the first body member axis, wherein the distal ends of the first and second locking members define locking free end portions terminating at locations spaced from the plane defined by the substantially planar base member by a predetermined distance D1. In an example embodiment, the second associated panel member has a thickness of about D1 or more.

In a further embodiment, the spring clip fastener includes a body member, a substantially planar base member operatively coupled with the body member, first and second carrier members on opposite first and second edges of the substantially planar base member, and first and second locking members carried on proximal ends thereof by the first and second carrier members respectively. The body member is configured to receive an associated joining fastener such as a threaded bolt for example along a first body member axis to selectively couple the associated first panel with the spring clip apparatus. Each of the first and second carrier members extend in a first direction substantially perpendicular to a plane defined by the substantially planar base member. In one embodiment, each of the first and second carrier members extend towards each other inwardly in a direction about 27° relative to a plane perpendicular to the plane defined by the substantially planar base member. The first and second locking members are directed relative to the first carrier member in a second direction substantially parallel with the first and second positioning members and each comprise a distal end extending outwardly of the first and second edges of the base member relative to the first body member axis, wherein the distal ends of the first and second locking members define locking free end portions terminating at locations spaced from the plane defined by the substantially planar base member by a predetermined distance D1. In an example embodiment, the second associated panel member has a thickness of about D1 or more.

Additional advantages and features of the embodiments herein will become apparent from the following description and appended claims, taken in conjunction with the accompanying drawings.

BRIEF DESCRIPTION OF THE DRAWINGS

The foregoing and other features of the embodiments herein will become apparent to those skilled in the art to which the present spring clip apparatus relates upon reading the following description with reference to the accompanying drawings, in which:

FIG. 8 is a cross-sectional view of the fastener apparatus of FIGS. 1 and 2 in an operative pre-assembled position coupled with the associated first panel member prior to the assembled position of FIG. 7a and taken along line 8-8 of FIG. 7a;

DETAILED DESCRIPTION OF EXAMPLE EMBODIMENTS

Figure 1:
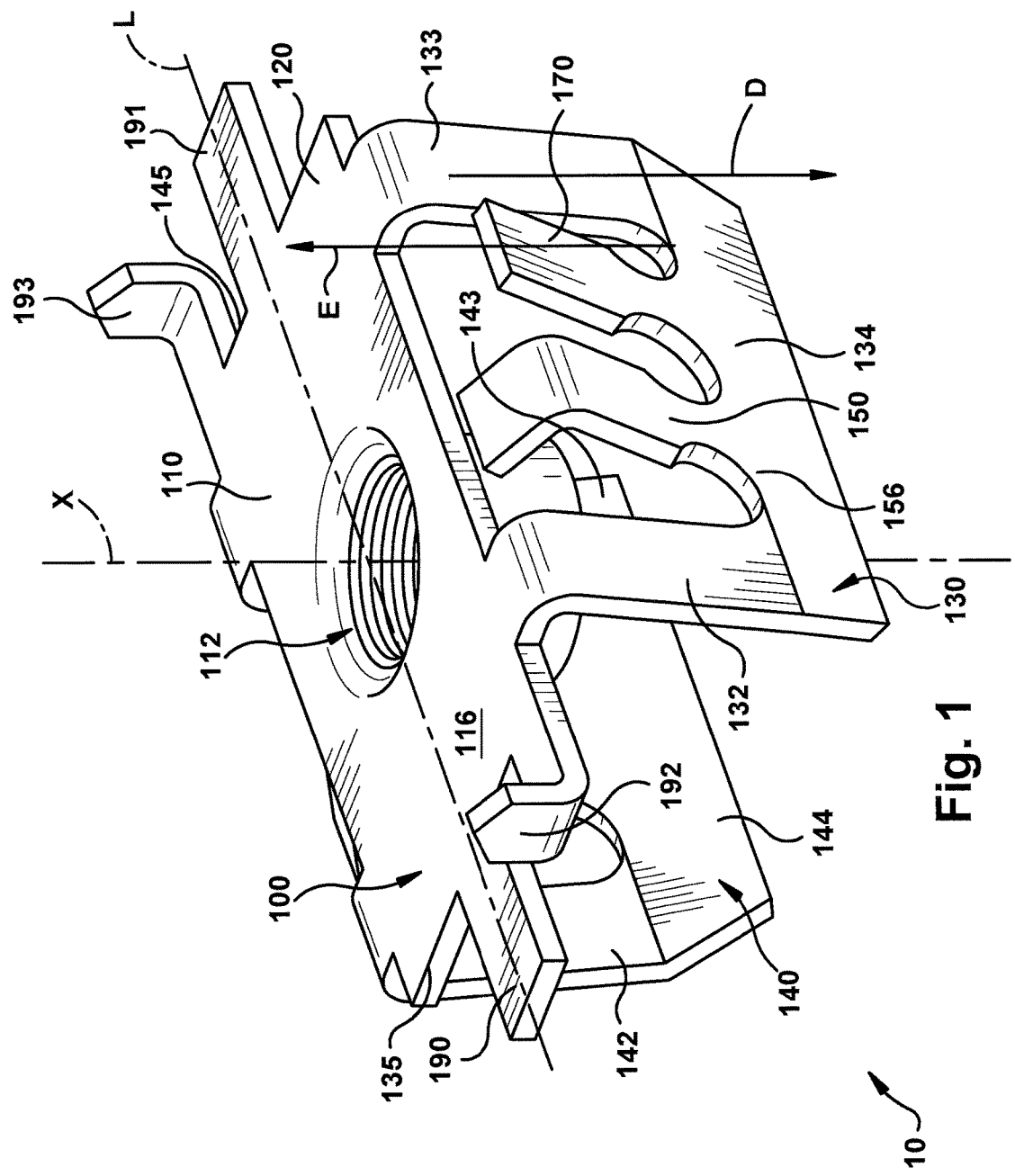
FIG. 1 is a top isometric view of a spring clip fastener apparatus in accordance with the example embodiment.

With reference now to the drawing Figures, wherein the showings are for purposes of describing the embodiments only and not for purposes of limiting same, the example embodiment of the invention claimed herein relates to a spring clip fastener apparatus for selectively releasably securing an associated first member with an associated second member. The embodiments herein are applicable to different fastener constructions as may be necessary or desired. As representative of the embodiments and with reference in particular first to FIGS. 1 and 2, a fastener 10 in the form of a spring clip apparatus 100 in accordance with the example embodiment is shown. The spring clip apparatus 100 has an overall saddle shape and is preferably formed as one piece from a metal material such as for example SAE 1050 steel having a thickness of about 0.76-0.84 in. and a hardness of about HRc 42-48 that has been cut and bent in to the shape generally illustrated. However, it is to be appreciated that the spring clip apparatus 100 could alternatively be made from one or more different materials such as other metals or from other materials or in a variety of different manners.

Figure 6:
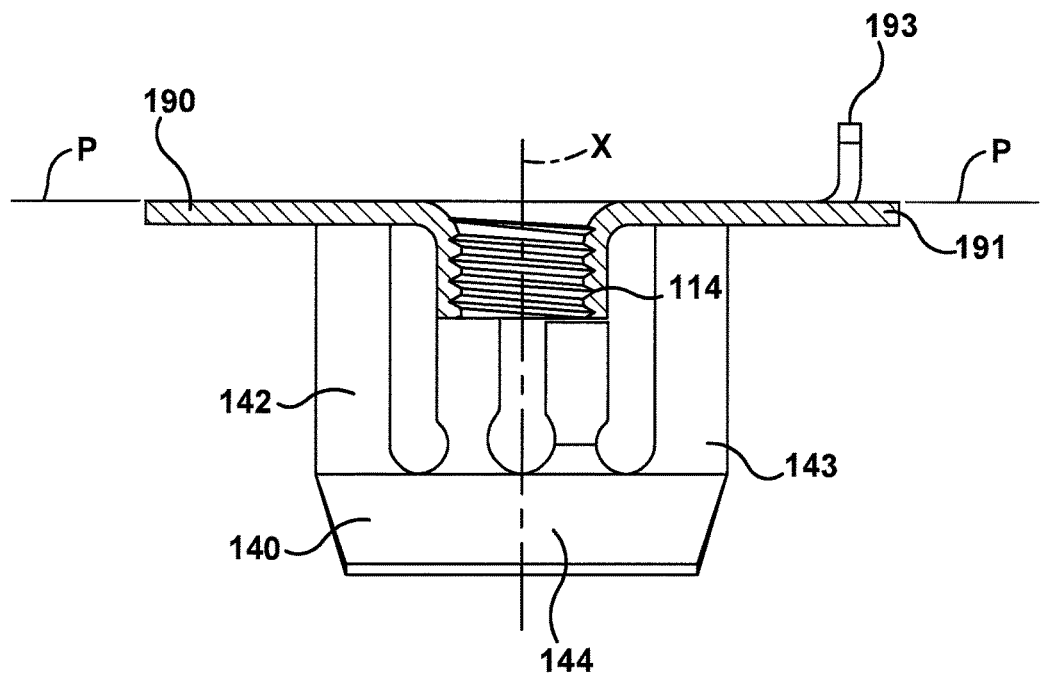
FIG. 6 is a cross-sectional view of the fastener apparatus of FIGS. 1 and 2 taken along line 6-6 of FIG. 3.
Figure 7A:
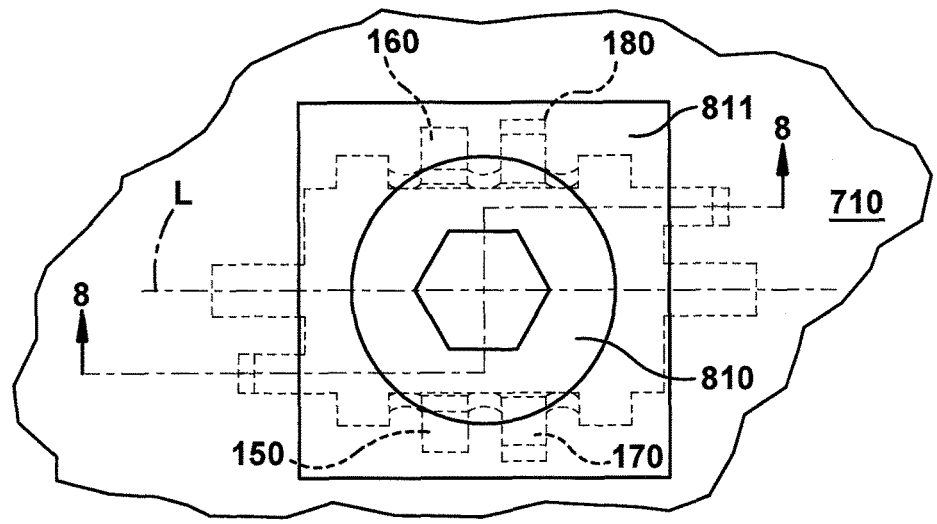
FIG. 7a is top plan view of the fastener apparatus of FIGS. 1 and 2 shown in an operative pre-assembled position coupled with an associated first panel member.
Figure 7B:
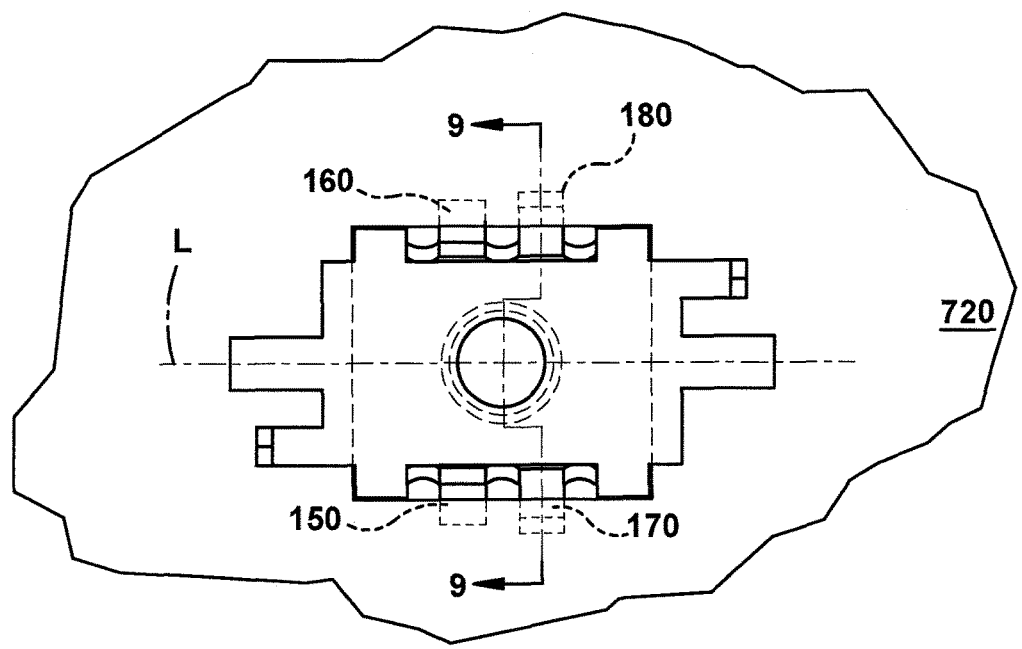
FIG. 7b is top plan view of the fastener apparatus of FIGS. 1 and 2 shown in an operative assembled position coupling the associated first panel member with an associated second panel member.
Figure 7C:
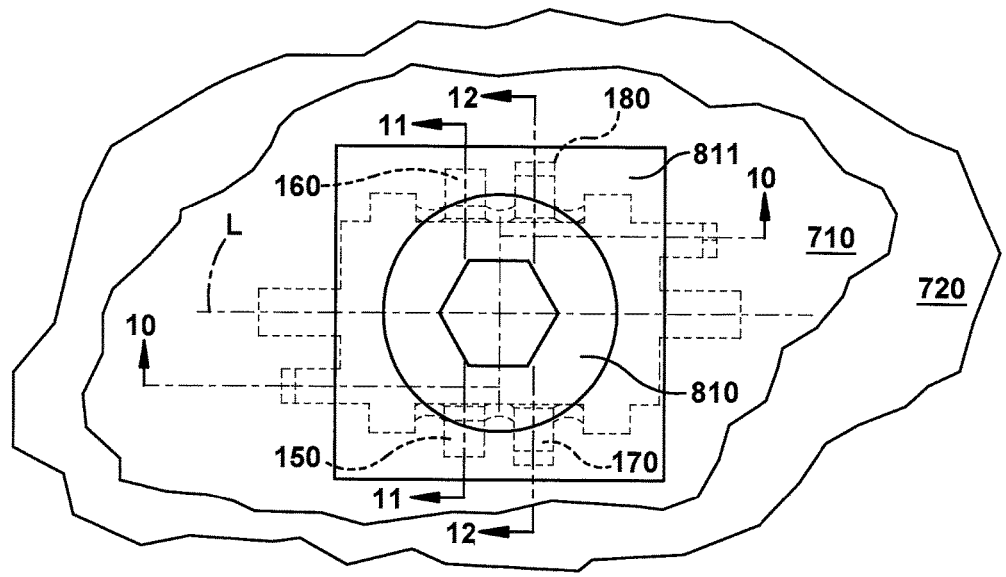
FIG. 7c is top plan view of the fastener apparatus of FIGS. 1 and 2 shown in an operative assembled position coupled with associated first and second panel members.

The spring clip apparatus 100 includes a body member 110 configured to receive an associated joining fastener 810 and washer 811 combination (FIGS. 8, 10-12) in an opening 112 of the body member 110 along a first body member axis X to selectively mutually couple an associated first panel member 710 (FIG. 7a) with the spring clip apparatus 100, and a substantially planar base member 120 operatively coupled with the body member 110. In the example embodiment, the planar base member 120 is formed integrally with the body member 110 and is centered on a linear axis L defined by the body member 110, wherein the linear axis L is substantially perpendicular relative to the first body member axis X. The opening 112 in the example embodiment extends through the body member 110 and defines internal threads 114 (FIG. 6) provided for selective threaded matable coupling with the associated joining fastener 810 and washer 811. In the example embodiment, the associated first panel member 710 is selectively received on a positioning surface 116 of the base member 120 and is coupled with the spring clip apparatus 100 in a manner wherein the associated first panel member 710 is held between the underside of a head portion of the associated joining fastener 810 and washer 811 and the positioning surface 116 of the base member 120 by a tightening of the joining fastener along the first body member axis X as best shown for example in FIG. 8. Portions of the subject spring clip apparatus 100 engage with, then embed into the first panel member in a manner to be described in greater detail below as the fastener 810 is tightened. Engagement of these portions of the spring clip apparatus 100 help to prevent relative rotation between the spring clip apparatus and the associated panel as the fastener 810 is tightened.

Figure 2:
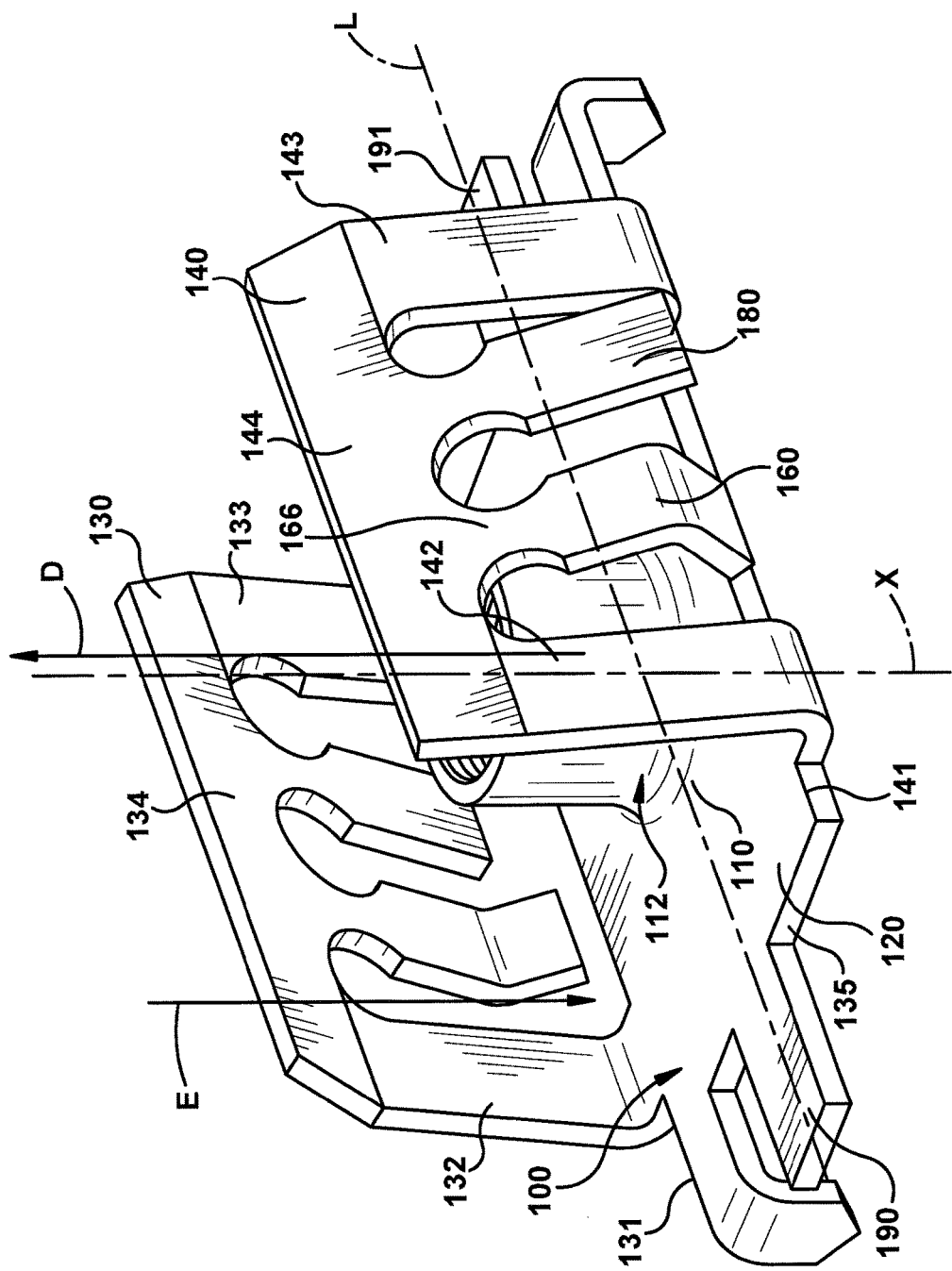
FIG. 2 is a bottom isometric view of the spring clip fastener apparatus of FIG. 1.
Figure 3:
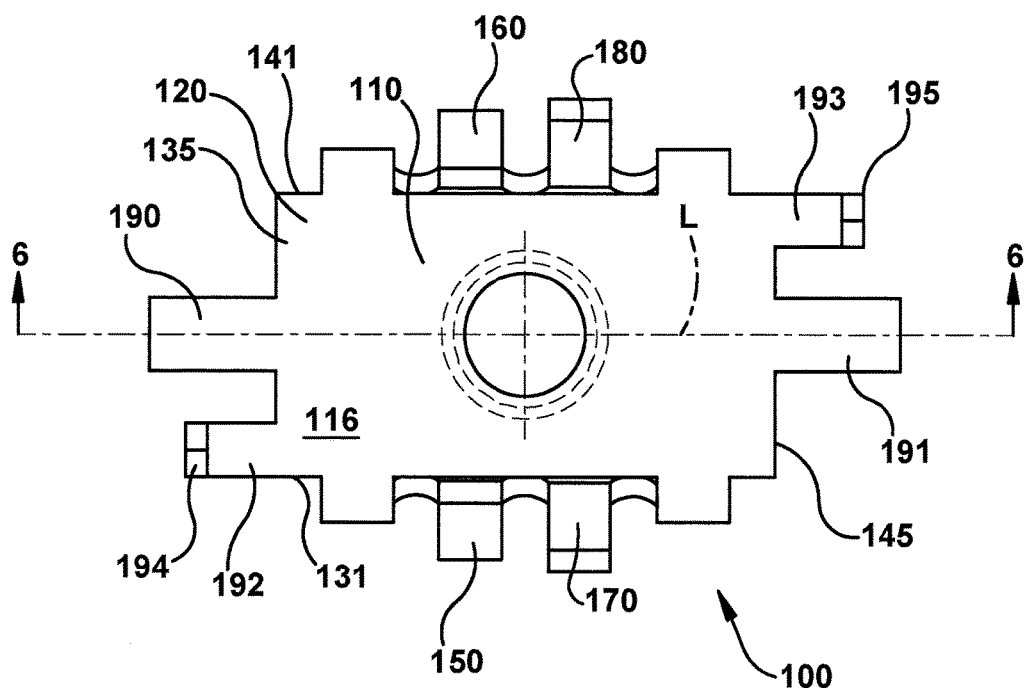
FIG. 3 is a top plan view of the fastener apparatus of FIGS. 1 and 2.
Figure 4:
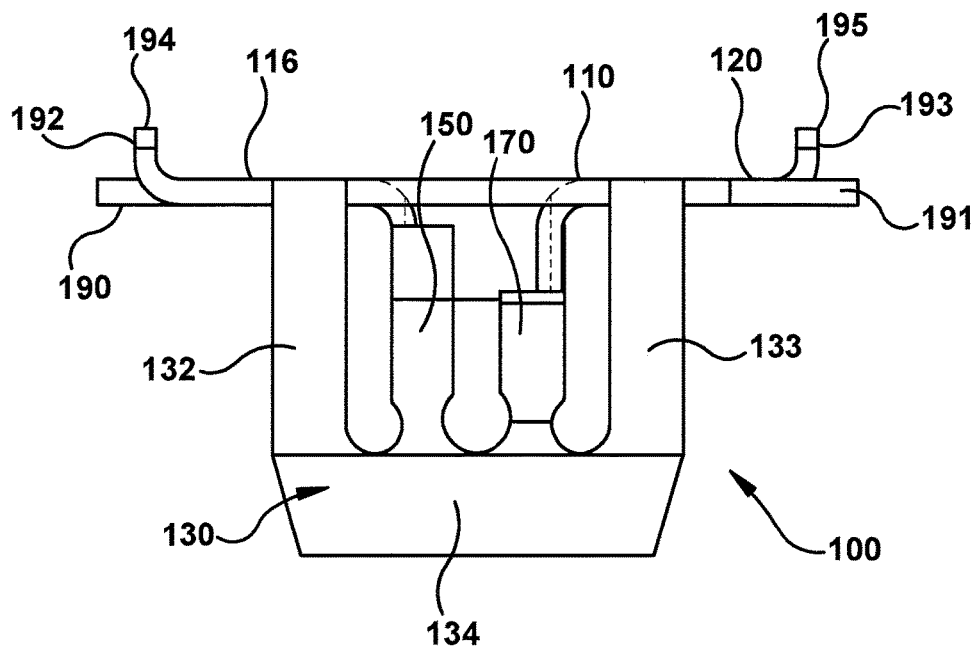
FIG. 4 is a side elevational view of the fastener apparatus of FIGS. 1 and 2.

With continued reference to FIGS. 1 and 2, the spring clip apparatus 100 of the example embodiment further includes a first carrier member 130 and a second carrier member 140 wherein the first and second carrier members 130, 140 are disposed on opposite first and second edges 131, 141, of the substantially planar base member, respectively. Each of the first and second carrier members 130, 140 extend in a first direction D substantially perpendicular to a plane P defined by the substantially planar base member 120. As will be described in greater detail below, the first and second carrier members 130, 140 are configured to extend into and through an opening 722 (FIG. 9) suitably provided on a second associated panel member 720 (FIG. 9) to capture the spring clip apparatus 100 relative to the second panel 720. In this way, in one pre-assembly arrangement, the second panel 720 carries the spring clip apparatus 100 in an orientation ready to engage the first panel member 710 for mutually fastening the first and second panel members 710, 720 in a face to face relationship. It is to be appreciated, however, that in another pre-assembly arrangement, the first panel member 710 carries the spring clip apparatus 100 using the associated threaded joining fastener 810 and washer 811 for example, in an orientation ready to engage the second panel member 720 for mutually fastening the first and second panel members 710, 720 in the face to face relationship.

Figure 5:
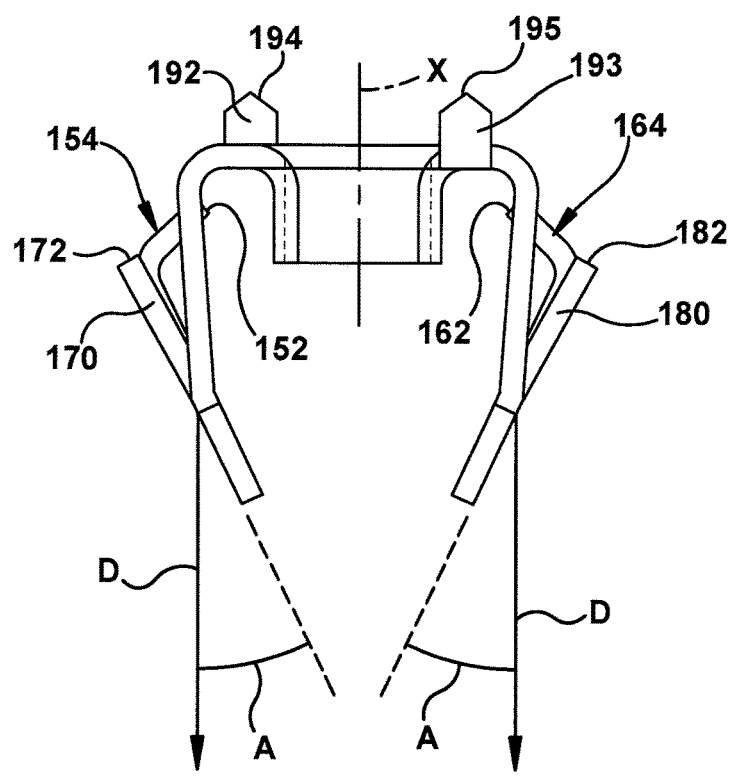
FIG. 5 is an end elevational view of the fastener apparatus of FIGS. 1 and 2.

The first and second carrier members 130, 140 are configured in the example embodiment to support plural additional members provided for helping to guide the carrier members into the opening 722 provided in the second associated panel member 720, for helping to locate the spring clip apparatus 100 relative to a center of the opening 722, and for helping to secure the carrier members 130, 140 relative to the second associated panel member 720. First in this regard, each of the first and second carrier members 130, 140 have an overall generally U shape wherein the first carrier member 130 is defined by a pair of spaced apart leg members 132, 133 oriented to extend away from the base member 120 generally in the first direction D and having ends thereof joined by a cross member 134 extending generally transvers the first body member axis X and along the linear axis L. Similarly, the second carrier member 140 is defined by a pair of spaced apart leg members 142, 143 oriented to extend away from the base member 120 generally in the first direction D and having ends thereof joined by a cross member 144 extending generally transvers the first body member axis X and along the linear axis L. In the example embodiment, each of the leg members 132, 133 of the first carrier member 130, as well as each of the first and second leg members 142, 143 of the second carrier member 140, are disposed in a plane substantially perpendicular to the plane P defined by the base member 120. In addition, each of the first and second cross members 134, 144, are bent mutually inwardly towards the first body member axis X forming an angle A (FIG. 5) relative to the first direction D and terminate a locations generally inwardly relative to the first and second edges 131, 141 of the base member 120 as shown best in FIG. 5. The inward bends of the cross members 134, 144 are functional in the example embodiment to help guide the carrier members 130, 140 into the opening provided on the second associated panel member 720. Preferably, in the example embodiment, the first and second cross members 134, 144 are each substantially planar and are bent mutually inwardly towards the first body member axis X forming an angle A of about 27° relative to the first direction D. In another example embodiment, each of the first and second cross members 134, 144 are curved inwardly towards each other forming smooth lead-in portions allowing the subject spring clip apparatus to be easily inserted into the along the first direction D.

In addition to the above, each of the first and second carrier members 130, 140 support positioning members 150, 160 carried on a proximal ends thereof by the first and second carrier members 130, 140, respectively. The positioning members 150, 160 extend outwardly from the first and second carrier members 134, 144, respectively, and are directed relative to carrier members in a second direction E substantially opposite the first direction D. In the example illustrated and as shown also in FIG. 5, the positioning members 150, 160 include distal ends 152, 162 extending outwardly of the edges 131, 141 of the base member respectively relative to the first body member axis X as best shown in the cross-sectional view of FIG. 5. In their preferred form, the distal ends 152, 162 of the positioning members define free end portions 154, 164 curved inwardly relative to the first body member axis. The positions and conformations of the positioning members 150, 160 are functional in the example embodiment first to help guide the spring clip apparatus 100 as it is moved relative to the opening 722 of the second associated panel member 720 and, thereafter, to help to centrally locate the spring clip apparatus 100 relative to a center of the opening 722 of the second associated panel member 720 such as best shown for example in cross-section in FIGS. 9, 11, and 12. In this regard, live hinges 156, 166 are formed between the positioning members 150, 160 and the respective cross members 134, 144 supporting the positioning members 150, 160 so that the positioning members 150, 160 may be bent from their relaxed positions shown best in FIGS. 1, 2, and 5 to their biased positions after insertion of the apparatus 100 into the opening 722 of the second panel member 720 as shown for example in in FIG. 11.

Further, each of the first and second carrier members 130, 140 support locking members 170, 180 carried on a proximal ends thereof by the first and second carrier members, respectively. The locking members 170, 180 extend outwardly from the first and second carrier members 134, 144, respectively, and are directed relative to the carrier members in the second direction E substantially opposite the first direction D. In the example illustrated, the locking members 170, 180 include distal ends 172, 182 extending outwardly of the edges 131, 141 of the base member respectively relative to the first body member axis X as best shown in the cross-sectional view of FIG. 5. In their preferred form and with reference to FIG. 9, the distal ends 172, 182 of the locking members define locking free end portions 174, 184 terminating at locations spaced from the plane P defined by the substantially planar base member 120 by a predetermined distance D1. In the example embodiment, the second associated panel member 720 has a thickness of about D1 or more. Accordingly, the positions and conformation of the locking members 170, 180 are functional in the example embodiment to help to secure the carrier members 130, 140 relative to the second associated panel member 720 as best shown for example in cross-section in FIGS. 9 and 12.

Figure 9:
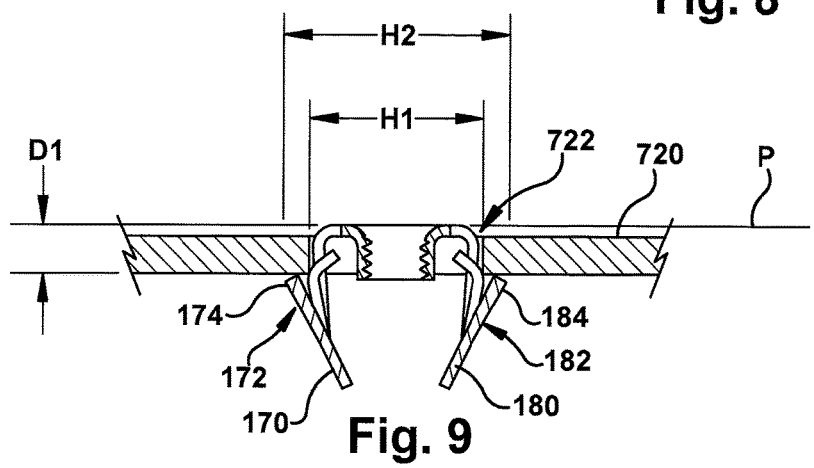
FIG. 9 is a cross-sectional view of the fastener apparatus of FIGS. 1 and 2 in an operative pre-assembled position coupled with the associated second panel member prior to the assembled position of FIG. 7b and taken along line 9-9 of FIG. 7b.

It is to be appreciated that selection of the locations of the locking free end portions 174, 184 is based on the thickness of the associated second panel member wherein the predetermined distance D1 may be increased or decreased in accordance with application of the subject spring clip apparatus relative to target panels. In addition to the above, the locking free end portions 174, 184 extend outwardly relative to the plane defined by the body member axis X and the linear axis L by a distance in the example embodiment of about H2 selected in accordance with a width H1 of the opening 722 provided in the second panel member 720. The locking members 170, 180 are inherently flexible wherein they are operable to flex inwardly towards the plane defined by the body member axis X and the linear axis L while the apparatus 100 is inserted into the opening 722, and then spring outwardly away from the plane defined by the body member axis X and the linear axis L after insertion thereby capturing the apparatus 100 relative to the second panel member 720. Thus, in the example embodiment, the spring clip apparatus 100 may be first installed onto the second panel member 720 as shown in FIG. 9 and thereafter selectively receive the associated joining fastener 810 and washer 811 carrying the first panel member 710 for mutual coupling of the first and second panels 710, 720 in the relative positions shown in FIGS. 10-12.

Figure 8:
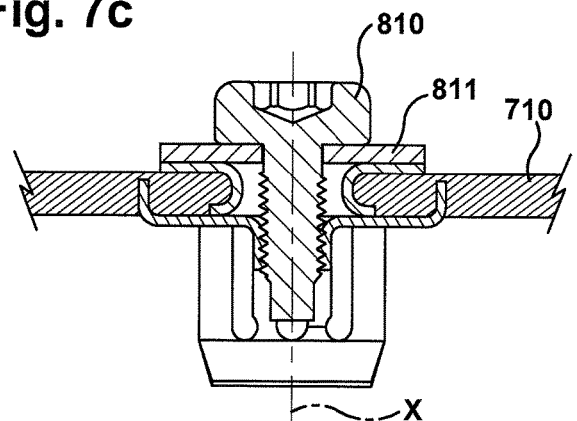
Figure 10:
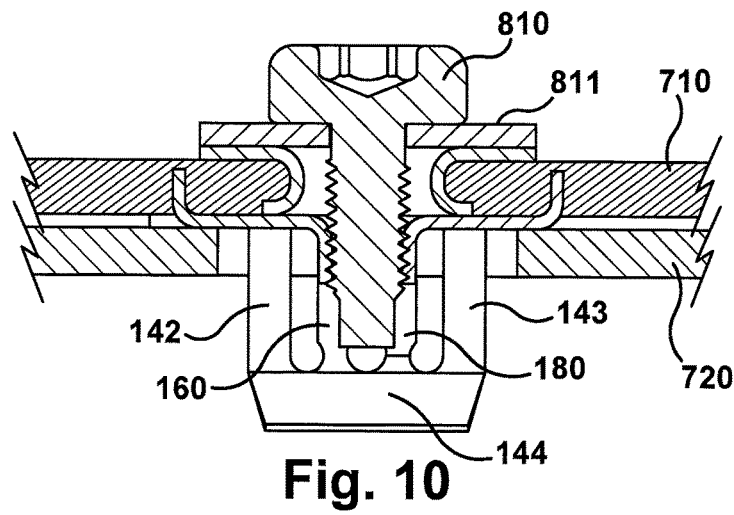
FIG. 10 is a cross-sectional view of the fastener apparatus of FIGS. 1 and 2 shown in the operative assembled position coupling the associated first and second panel members and taken along line 10-10 of FIG. 7c.

The example embodiment of the subject spring clip apparatus 100 further includes first and second substantially flat tab members 190, 191 carried on edges 135, 145 of the base member 120 and directed outwardly relative to the body member axis X and substantially along the linear axis L. The flat tab members are useful in helping to locate the base member 120 relative to the associated panel members during use of the device. In addition, first and second affixing tab members 192, 193 are similarly carried on the edges 135, 145 of the base member 120 and are generally directed outwardly relative to the body member axis X and substantially along the linear axis L. However, the affixing tab members 192, 193 carry on distal ends thereof embeddable tab portions 194, 195 formed by upward bends provided to the affixing tab members 192, 193 in the second direction E. As best shown in FIGS. 8 and 10, the embeddable tab portions 194, 195 formed on the tab members 192, 193 are configured for selective imbedding into the first associated panel when the associated first panel member 710 is selectively tightened relative to the positioning surface 116 of the base member 120 by the associated joining fastener 810 and washer 811 as best shown for example in FIGS. 8 and 10.

Figure 11:
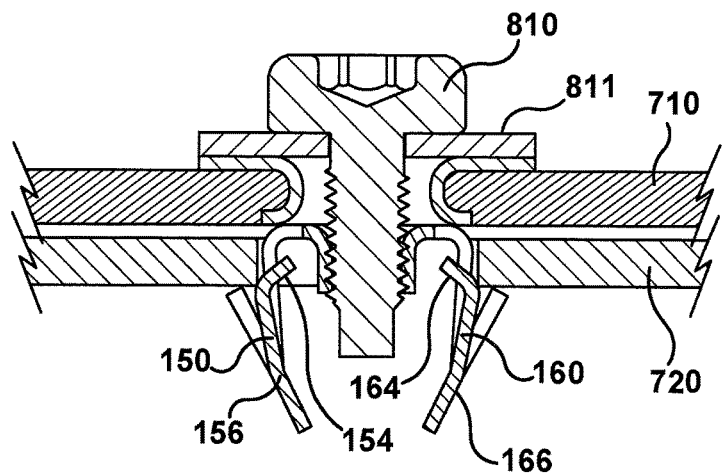
FIG. 11 is a cross-sectional view of the fastener apparatus of FIGS. 1 and 2 shown in the operative assembled position coupling the associated first and second panel members and taken along line 11-11 of FIG. 7c; and, FIG. 12 is a cross-sectional view of the fastener apparatus of FIGS. 1 and 2 shown in the operative assembled position coupling the associated first and second panel members and taken along line 12-12 of FIG. 7c.
Figure 12:
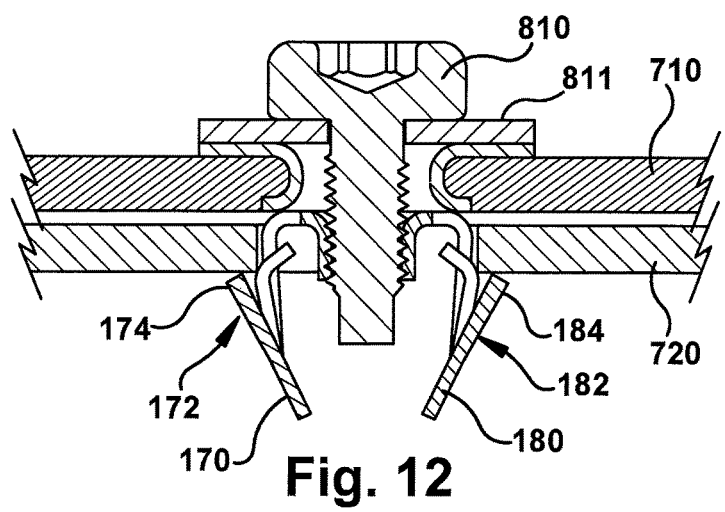

Thus, in the example embodiment, the spring clip apparatus 100 may be first installed onto the first panel member 710 as shown in FIG. 8 and thereafter inserted into the opening 722 of the second panel member 720 in a manner as described above, for mutual coupling of the first and second panels 710, 720 in the relative positions shown in FIGS. 10-12. Alternatively and in a further example embodiment, the spring clip apparatus 100 may be first installed onto the second panel member 720 by inserting it into the opening 722 of the second panel member 720 in a manner as described above, and thereafter the first and second associated panels may be mutually coupled using the associated joining fastener 810 and washer 811 in a manner as described above.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

Having thus described the example embodiments, it is now claimed:

1. A spring clip apparatus (100) comprising:
    a body member (110) configured to receive an associated fastener along a first body member axis to selectively couple an associated first panel member with the spring clip apparatus;
    first and second carrier members (130, 140) on opposite first and second edges of the body member, respectively, each of the first and second carrier members extending in a first direction substantially perpendicular to a plane defined by the body member, the first carrier member being defined by a first set of legs (132, 133) and the second carrier member being defined by a second set of legs (142, 143);
    a first positioning member (150) carried on a proximal end thereof by the first carrier member, the first positioning member being directed relative to the first carrier member in a second direction substantially opposite the first direction and comprising a distal end extending outwardly of the first edge of the body member relative to the first body member axis, the distal end of the first positioning member defining a free end portion curved inwardly relative to the first body member axis;
    a first locking member (170) carried on a proximal end thereof by the first carrier member interior the first set of legs, the first locking member being directed relative to the first carrier member in the second direction substantially parallel with the first positioning member and comprising a distal end extending outwardly of the first edge of the body member relative to the first body member axis, the distal end of the first locking member defining a locking free end portion terminating at a position spaced from the plane defined by the body member by a predetermined distance;
    a second positioning member (160) carried on a proximal end thereof by the second carrier member, the second positioning member being directed relative to the second carrier member in the second direction substantially opposite the first direction and comprising a distal end extending outwardly of the second edge of the body member relative to the first body member axis, the distal end of the second positioning member defining a free end portion curved inwardly relative to the first body member axis; and
    a second locking member (180) carried on a proximal end thereof by the second carrier member interior the second set of legs, the second locking member being directed relative to the second carrier member in the second direction substantially parallel with the second positioning member and comprising a distal end extending outwardly of the second edge of the body member relative to the first body member axis, the distal end of the second locking member defining a locking free end portion terminating at a position spaced from the plane defined by the body member by the predetermined distance.

2. The spring clip apparatus (100) according to claim 1, wherein:
    the first carrier member (130) comprises a first cross member (134) supported relative to the body member (110) by the first set of leg members (132, 133) extending from the first edge (131) of the body member; and
    the second carrier member (140) comprises a second cross member (144) supported relative to the body member (110) by Hall the second set of leg members (142, 143) extending from the second edge (141) of the body member.

3. The spring clip apparatus (100) according to claim 2, wherein:
    the first and second cross members (134, 144) extend inwardly of the first and second edges (131, 141), respectively, of the body member relative to the first body member axis.

4. The spring clip apparatus (100) according to claim 3, wherein:
    the first and second cross members (134, 144) extend mutually inwardly towards the first body member axis forming an angle of about 27° relative to the first direction.

5. The spring clip apparatus (100) according to claim 1, further comprising:
    first and second substantially flat tab members (190, 191) carried on the edges (135, 145) of the body member, the first and second tab members (190, 191) being directed outwardly relative to the first body member axis and substantially along a linear axis, wherein the linear axis and the first body member axis are substantially perpendicular with respect to each other mutually perpendicular.

6. The spring clip apparatus (100) according to claim 1, further comprising:
first and second affixing tab members (192, 193) carried on the edges (135, 145) of the body member, the first and second affixing tab members (192, 193) being directed outwardly relative to the first body member axis and substantially along the linear axis; and
first and second embeddable tab portions (194, 195) formed on the first and second affixing tab members (192, 193), respectively, the first and second embeddable tab portions (194, 195) being formed by upward bends in the first and second affixing tab members (192, 193) in the second direction,
wherein the first and second embeddable tab portions (194, 195) are configured for selective embedding into the associated first panel member when the associated fastener tightens the first associated panel member against a positioning surface (116) of the body member.

7. The spring clip apparatus (100) according to claim 1, further comprising:
first and second affixing tab members (192, 193) carried on the edges (135, 145) of the body member, the first and second affixing tab members (192, 193) being directed outwardly relative to the first body member axis and substantially along the linear axis; and
first and second embeddable tab portions (194, 195) formed on the first and second affixing tab members (192, 193), respectively, the first and second embeddable tab portions (194, 195) being formed by upward bends in the first and second affixing tab members (192, 193) in the second direction,
wherein the first and second embeddable tab portions (194, 195) are configured for selective embedding into the first associated panel member when the associated fastener tightens the associated first panel member against a positioning surface (116) of the body member.

8. A spring clip apparatus comprising:
a body member (110) configured to receive an associated fastener along a first body member axis to selectively couple an associated first panel member with the spring clip apparatus;
first and second carrier members (130, 140) on opposite first and second edges of the body member, respectively, each of the first and second carrier members extending in a first direction substantially perpendicular to a plane defined by the body member, the first carrier member being defined by a first set of legs (132, 133) and the second carrier member being defined by a second set of legs (142, 143);
a first locking member (170) carried on a proximal end thereof by the first carrier member interior the first set of legs, the first locking member being directed relative to the first carrier member in the second direction opposite the first direction and comprising a distal end extending outwardly of the first edge of the body member relative to the first body member axis, the distal end of the first locking member defining a locking free end portion terminating at a location spaced from the plane defined by the body member by a predetermined distance; and
a second locking member (180) carried on a proximal end thereof by the second carrier member interior the second set of legs, the second locking member being directed relative to the second carrier member in the second direction and comprising a distal end extending outwardly of the second edge of the body member relative to the first body member axis, the distal end of the second locking member defining a locking free end portion terminating at a location spaced from the plane defined by the body member by the predetermined distance.

9. The spring clip apparatus (100) according to claim 8, wherein:
the first carrier member (130) comprises a first cross member (134) supported relative to the body member (110) by the first set of leg members (132, 133) extending from the first edge (131) of the body member; and
the second carrier member (140) comprises a second cross member (144) supported relative to the body member (110) by the second set of leg members (142, 143) extending from the second edge (141) of the body member.

10. The spring clip apparatus (100) according to claim 9, wherein:
the first and second cross members (134, 144) extend inwardly of the first and second edges (131, 141), respectively, of the body member relative to the first body member axis.

11. The spring clip apparatus (100) according to claim 10, wherein:
the first and second cross members (134, 144) extend mutually inwardly towards the first body member axis forming an angle of about 27° relative to the first direction.

12. The spring clip apparatus (100) according to claim 8, further comprising:
first and second substantially flat tab members 190, 191) carried on the edges (135, 145) of the body member, the first and second tab members (190, 191) being directed outwardly relative to the first body member axis and substantially along a linear axis, wherein the linear axis and the first body member axis are substantially perpendicular with respect to each other.

13. The spring clip apparatus (100) according claim 12, further comprising:
first and second affixing tab members (192, 193) carried on the edges (135, 145) of the body member, the first and second affixing tab members (192, 193) being directed outwardly relative to the first body member axis and substantially along the linear axis; and
first and second embeddable tab portions (194, 195) formed on the first and second affixing tab members (192, 193), respectively, the first and second embeddable tab portions (194, 195) being formed by upward bends in the first and second affixing tab members (192, 193) in the second direction,
wherein the first and second embeddable tab portions (194, 195) are configured for selective embedding into the associated first panel member when the associated fastener tightens the associated first panel member against a positioning surface of the body member.

14. The spring clip apparatus (100) according to claim 8, further comprising:
first and second affixing tab members (192, 193) carried on the edges (135, 145) of the body member, the first and second affixing tab members (192, 193) being directed outwardly relative to the first body member axis and substantially along the linear axis; and
first and second embeddable tab portions (194, 195) formed on the first and second affixing tab members (192, 193), respectively, the first and second embeddable tab portions (194, 195) being formed by upward bends in the first and second affixing tab members (192, 193) in the second direction, wherein the first and second embeddable tab portions (194, 195) are configured for selective embedding into the associated first panel member when the associated fastener tightens the associated first panel member against a positioning surface (116) of the body member.

15. The spring clip apparatus (100) according to claim 8, further comprising:
a first positioning member (150) carried on a proximal end thereof by the first carrier member, the first positioning member being directed relative to the first carrier member in the second direction substantially opposite the first direction and comprising a distal end extending outwardly of the first edge of the body member relative to the first body member axis, the distal end of the first positioning member defining a free end portion curved inwardly relative to the first body member axis; and
a second positioning member (160) carried on a proximal end thereof by the second carrier member, the second positioning member being directed relative to the second carrier member in the second direction substantially opposite the first direction and comprising a distal end extending outwardly of the second edge of the body member relative to the first body member axis, the distal end of the second positioning member defining a free end portion curved inwardly relative to the first body member axis.

16. A spring clip apparatus comprising:
a base member comprising a top panel receiving surface, a bottom panel receiving surface, and an aperture therethrough to receive an associated fastener along an axis to selectively couple an associated panel member with the spring clip apparatus;
a first and a second carrier member attached to respective first and second sides of the base member, the first and second carrier members defined by a respective first and second pair of legs that extend downward away from the bottom panel receiving surface in a first direction substantially perpendicular to the bottom panel receiving surface and each terminating at a respective first and second carrier base, the first carrier member further comprising a first locking element interior the first pair of legs and the second carrier member further comprising a second locking element interior the second pair of legs, the first and second locking elements extending upward from their respective carrier base to a first and second location respectively, the first location being spaced away from the first side of the base member and the second location being spaced away second side of the base member.

17. The spring clip apparatus according to claim 16 further comprising:
a first positioning member interior the first pair of legs and extending upward from the first carrier base, the first positioning member comprising a first free end portion that is curved inward towards the first side of the base member; and
a second positioning member interior the second pair of legs and extending upward from the second carrier base, the second positioning member comprising a second free end portion that is curved inward towards the second side of the base member.

18. The spring clip apparatus according to claim 16 further comprising:
at least one affixing tab member carried on at least one side of the base member, the at least one affixing tab member extending away from the at least one side of the base member in an orientation that is substantially planar with the base member top and bottom panel receiving surfaces and terminating in an embeddable portion, each embeddable portion extending upward in a second direction that is substantially parallel to the axis.

19. The spring clip apparatus according to claim 16, wherein:
the first carrier base comprises a first cross member that extends inward of the first side of the base member and
the second carrier base comprises a second cross member that extends inward of the second side of the base member.

20. The spring clip apparatus according to claim 16, further comprising:
at least one substantially flat tab member carried on at least one side of the base member, the at least one substantially flat tab member extending away from the base member at an orientation that is substantially planar with the base member top and bottom panel receiving surfaces.

* * * * *